United States Patent
Zhou

(10) Patent No.: US 12,452,912 B2
(45) Date of Patent: Oct. 21, 2025

(54) DATA TRANSMISSION METHOD, ACCESS NETWORK DEVICE AND STORAGE MEDIUM

(71) Applicant: Beijing Xiaomi Mobile Software Co., Ltd., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 426 days.

(21) Appl. No.: 17/928,920

(22) PCT Filed: Jun. 12, 2020

(86) PCT No.: PCT/CN2020/095914
§ 371 (c)(1),
(2) Date: Nov. 30, 2022

(87) PCT Pub. No.: WO2021/248480
PCT Pub. Date: Dec. 16, 2021

(65) Prior Publication Data
US 2023/0239918 A1    Jul. 27, 2023

(51) Int. Cl.
*H04L 27/26* (2006.01)
*H04W 74/04* (2009.01)

(52) U.S. Cl.
CPC ......... *H04W 74/04* (2013.01); *H04L 27/2613* (2013.01)

(58) Field of Classification Search
CPC . H04L 27/00; H04L 27/2602; H04L 27/2613; H04L 27/2655; H04W 74/04
See application file for complete search history.

(56) References Cited

U.S. PATENT DOCUMENTS

2019/0020741 A1* 1/2019 Knaappila ............... H04W 4/80

FOREIGN PATENT DOCUMENTS

| CN | 103312658 A | 9/2013 |
| CN | 107302503 A | 10/2017 |
| WO | 2016066280 A1 | 5/2016 |

\* cited by examiner

*Primary Examiner* — Melvin C Marcelo
*Assistant Examiner* — Natali Pascual Peguero
(74) *Attorney, Agent, or Firm* — Volpe Koenig

(57) ABSTRACT

A method for data transmission, the method including: receiving transmissions of at least two channels; determining a sequence of the transmissions through the at least two channels; and processing the received transmissions through the at least two channels according to the sequence of the transmissions through the at least two channels.

20 Claims, 4 Drawing Sheets

DATA TRANSMISSION METHOD, ACCESS NETWORK DEVICE AND STORAGE MEDIUM

CROSS REFERENCE TO RELATED APPLICATION

The present application is a U.S. National Stage of International Application No. PCT/CN2020/095914, filed on Jun. 12, 2020, the contents of all of which are incorporated herein by reference in their entireties for all purposes.

BACKGROUND

With 5G standards and products becoming mature, various technologies for subsequent evolution of 5G have gradually entered everyone's field of vision, and have become a research direction of mainstream manufacturers in various countries and the world. Like evolution of each generation of communication systems, the subsequent evolution of 5G technologies will also see increase of transmission rate by dozens of times compared with 5G. In order to achieve a huge improvement in transmission rate and other indicators, some technical solutions are considered, including an orbital angular momentum (OAM) scheme, also known as vortex waves.

SUMMARY

Examples of the disclosure provide a data transmission method and apparatus, an access network device and a storage medium. A technical solution is as follows.

According to one aspect of an example of the disclosure, a data transmission method is provided and includes: receiving transmissions through at least two channels; determining a sequence of the transmissions through the at least two channels; and processing the received transmissions through the at least two channels according to the sequence of the transmissions through the at least two channels.

According to another aspect of an example of the disclosure, an access network device, is provided and includes: a processor; and a memory configured to store an instruction executable by the processor. The processor is configured to load and execute the executable instruction to implement the aforesaid data transmission method.

According to another aspect of an example of the disclosure, a non-transitory computer readable storage medium is provided. The non-transitory computer readable storage medium, when an instruction stored is executed by a processor, is able to execute the aforesaid data transmission method.

It should be understood that both the foregoing general description and the following detailed description are illustrative and explanatory only and cannot limit the disclosure.

BRIEF DESCRIPTION OF THE DRAWINGS

Drawings here are incorporated into the specification, constitute a part of the specification, show examples in accordance with the disclosure, and together with the specification are used to explain principles of the disclosure.

DETAILED DESCRIPTION

Figure 1:
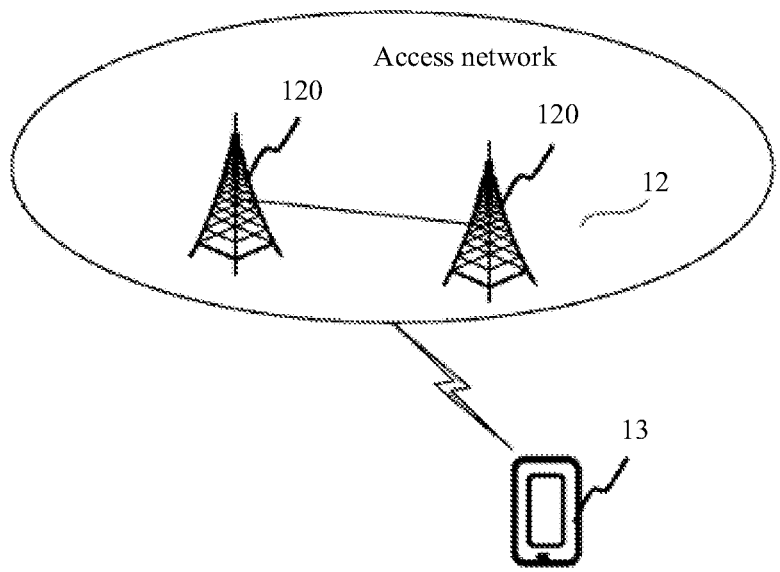
FIG. 1 illustrates a block chart of a communication system provided by one example of the disclosure.

Examples will be described in detail here, instances of which are illustrated in the drawings. When the following description refers to the drawings, the same numerals in different drawings refer to same or similar elements unless otherwise indicated. The implementations described in the examples below are not intended to represent all implementations consistent with the disclosure. On the contrary, they are merely instances of apparatuses and methods consistent with some aspects of the disclosure as recited in the appended claims.

FIG. 1 illustrates a block chart of a communication system provided by one example of the disclosure. As shown in FIG. 1, the communication system may include: an access network 12 and a terminal 13.

The access network 12 includes a plurality of access network devices 120. Each access network device 120 may be a base station. Each base station is an apparatus that is deployed in the access network and configured to provide a wireless communication function for the terminal. The base stations may include various forms of macro base stations, micro base stations, relays, access points, etc. In systems using different wireless access technologies, a device equipped with functions of the base station may vary in name. In a 5G new radio (NR) system, the device is called gNodeB or gNB. With evolution of communication technologies, the name "base station" may be changed. For example, the base station may be in other names in networks of various technologies in subsequent evolution of 5G. For the sake of description, the abovementioned apparatuses providing the wireless communication function for the terminal will be collectively referred to as access network devices below.

The terminal 13 may include various handheld devices, vehicle-mounted devices, wearable devices, or computing devices with a wireless communication function, or any other processing devices (such as sensors) connected to a wireless modem, or various forms of user devices, mobile stations (MS), terminals and the like. For the sake of description, the abovementioned devices are collectively referred to as terminals. The access network device 120 and the terminal 13 communicate with each other through some kind of air interface technology, such as a Uu interface.

With 5G standards and products becoming mature, various technologies for subsequent evolution of 5G have gradually entered everyone's field of vision, and have become a research direction of mainstream manufacturers in various countries and the world. Like evolution of each generation of communication systems, the subsequent evolution of 5G technologies will also see increase of transmission rate by dozens of times compared with 5G. In order to achieve a huge improvement in transmission rate and other indicators, some technical solutions are considered, including an orbital angular momentum (OAM) scheme, also known as vortex waves.

Based on characteristics of the vortex waves, vortex waves with different phase shifts may be superimposed and transmitted in the same frequency band, so as to achieve multi-dimensional transmission, thus expanding a transmission capacity. Due to the expansion of the transmission capability, the application of various technologies in the subsequent evolution of 5G will also expand simple interconnection into intelligent interconnection, which includes multi-sensor data fusion aiming to achieve a prospect goal of digital twins. Multi-sensor data fusion includes transmission of various forms of sensor (multimodal) data, such as the transmission and fusion of sensor information such as visual, auditory, haptical, and photoelectric information.

When fusion of multiple forms of sensor data is performed, a time sequence of each piece of sensor data is a key link to deriving its event logic. For example, in medical applications, the chronological sequence of EEG sensor data, EMG sensor data and motion sensor data (falls, etc.) has become a basis for diagnosis. For instance, a doctor needs to judge, based on the time sequence of each piece of sensor data, whether a case is that an electroencephalogram abnormality causes spasms (electromyography response), thus resulting in a fall; or that an electromyography abnormality is caused by a fall, thus forming an electroencephalogram abnormality.

In related technologies, timestamps are usually punched into the data to indicate the time of data acquisition, and when the transmissions are dense, a lot of signaling overhead is required to carry timestamp information. Under a circumstance that the timestamps are not used, because the sensors are different in transmission capability, there will be a situation of advance arrival of a transmission sent later, resulting in an inability to accurately judge the time sequence based on the time of receiving.

The communication system and service scenarios described in the examples of the disclosure are intended to explain the technical solutions of the examples of the disclosure more clearly, and do not constitute a limitation to the technical solutions provided in the examples of the disclosure. Those of ordinary skill in the art may be aware that with the evolution of the communication system and the emergence of new service scenarios, the technical solutions provided in the examples of the disclosure are equally applicable to similar technical problems.

Figure 2:
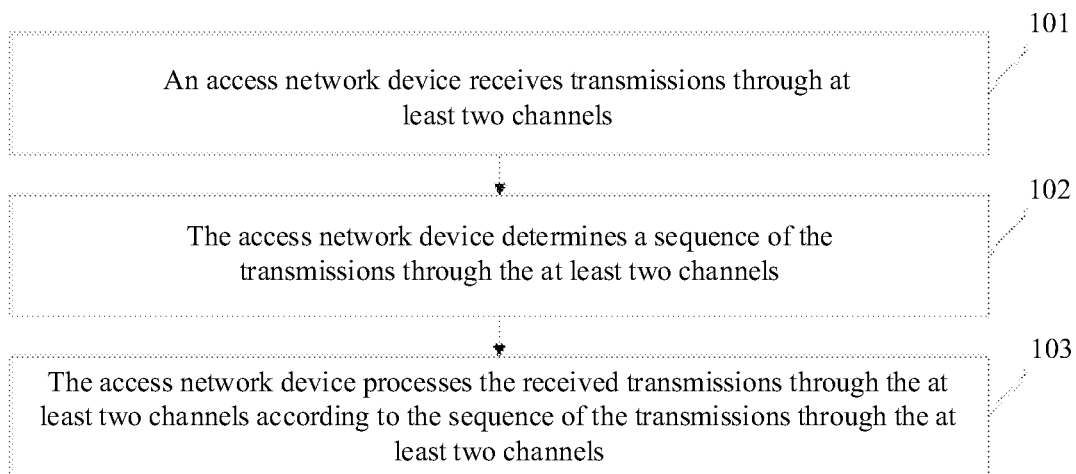
FIG. 2 is a flow chart of a method for data transmission illustrated according to an example.

FIG. 2 is a flow chart of a method for data transmission illustrated according to an example. Referring to FIG. 2, the method includes the following steps, 101-103.

In step 101, an access network device receives transmissions of at least two channels.

In all examples of the disclosure, a transmission through a channel may be any one of the following: transmission of data, signaling, and hybrid data and signaling. That is, the transmission of the channel may be data, signaling or hybrid data and signaling transmitted by the channel. The disclosure will be described below taking data as an example. It should be noted that, in addition to representing the above nouns, "transmission" in the disclosure may be used in a verbal form. For instance, in phrases like "transmitting data" and "performing transmission", the word "transmit/transmission" represents an act of transmitting.

Here, the at least two channels correspond to at least two devices. That is, the at least two devices transmit data to the access network device through the at least two channels. The device here is a terminal, such as a sensor.

Referring back to FIG. 2, in step 102, the access network device determines a sequence of the transmissions through the at least two channels. In this step, the transmissions through the at least two channels may be ranked based on priorities of the channels. For example, time corresponding to each channel may be divided into a plurality of continuous time window. Data received from the at least two channels within a set of time windows is ranked according to the priorities through the at least two channels. The set of time windows is at least two time windows in one-to-one correspondence to the at least two channels.

Normally, the time windows corresponding to each channel in the set of time windows have the same serial number. For instance, a first time window of a channel A receives data A from the channel A, and a first time window of a channel B receives data B from the channel B. In response to determining that a priority of the channel A is higher than that of the channel B, the data A is ranked ahead of the data B. It should be noted that, even though both the data A and the data B are received in the first time windows, actual receiving time of the data A is not necessarily ahead of that of the data B. As long as both are received in the first time windows and the priority of the channel A is higher than that of the channel B, the data A is ranked ahead of the data B.

The two channels may be the same or may be different in priority. In response to determining that the two channels are different in priority, the data is ranked according to the priority; and in response to determining that the two channels are the same in priority, corresponding data sequences are the same.

Finally, in step 103, the access network device processes the received transmissions through the at least two channels according to the sequence of the transmissions through the at least two channels.

For instance, a sequence of the data A is ahead of that of the data B, and the data A is parsed before the data B is parsed. Parsing here includes but is not limited to data decoding and data output. For instance, data of a medical sensor is decoded first, data that may be processed by a back-end processing device is obtained, then the decoded data is transmitted to the back-end processing device, and the back-end processing device performs diagnosis using the decoded data.

In an example of the disclosure, the sequence of the transmissions received from the at least two channels is determined first, and then the transmissions through the at least two channels are processed according to the sequence of the transmissions through the at least two channels. A processing sequence is no longer determined according to a sequence of receiving the transmissions or carrying timestamps. On the premise of not using the timestamps, it is not necessary to process the transmissions according to the sequence of receiving. That is, signaling overhead is not increased while low-delay time sequence data transmission may be realized.

In some examples, the at least two channels are vortex wave channels with the same frequency and with different phase shifts, or, the at least two channels are channels with different frequencies.

In the implementation, signals with different frequencies may be adopted, or signals with the same frequency may be adopted. In the circumstance that the signals with the same frequency are adopted, a characteristic of vortex waves with different phase shifts which may transmit under the same frequency is used. Hence, consumption of frequency resources is relatively low in a condition that service data carrying a time sequence logic is transmitted simultaneously or almost simultaneously by using the vortex wave channels with the same frequency.

In some examples, determining the sequence of the transmissions through the at least two channels includes the transmissions received from the at least two channels in a set of time windows are ranked according to a sequence through the at least two channels.

The set of time windows is at least two time windows in one-to-one correspondence to the at least two channels.

In the example of the disclosure, the data received from the at least two channels in the set of time windows is first ranked according to the priority through the at least two channels, and then is parsed. For instance, the data of the transmission of the channel with the high priority received in the set of time windows may be ranked ahead of the data of the transmission of the channel with the low priority. The time windows may be set according to a capability and service needs of the terminal, a situation that one piece of data through a channel is received in each time window may be ensured, and then the channels are divided by priority based on the capability of the terminal, so data parsing is performed according to a sequence of data acquisition without setting the timestamps. That is, on the premise that the data is transmitted without adopting the timestamps, the sequence of parsing the data of different channels is determined based on the sequence of data acquisition, and signaling overhead is not increased while low-delay time sequence data transmission may be realized.

In some examples, each channel corresponds to a plurality of continuous cyclic time windows.

The time windows are continuous and cyclic. The set of time windows correspond to the same number of cycles, and only the data received in the time windows in the same cycle will be compared in priority. For data received in different cycles, data received in a former cycle is ranked ahead of data received in a latter cycle.

In some examples, the first time window of each channel is a standard time window using standard time as reference time; or, the first time window of each channel is a relative time window using the time of receiving the first piece of data from the channel as the reference time.

Standard time here may refer to coordinated universal time (UTC), or may be standard time of a certain time zone, such as Beijing time. The standard time may also be standard time defined by a system, such as time defined by setting a certain moment as a moment 0. The standard time may also be time obtained by counting constituting units of a system frame structure, such as time corresponding to an XXth symbol.

Relative time uses time when a designated event occurs as a benchmark. For instance, all time windows are set on the basis of time when the first channel to receive data among all channels receives the first piece of data.

In some examples, the first time windows of any two channels correspond to the same or different in reference time.

A division manner of the time windows will be described by examples below in combination with FIG. 3 to FIG. 6.

Figure 3:
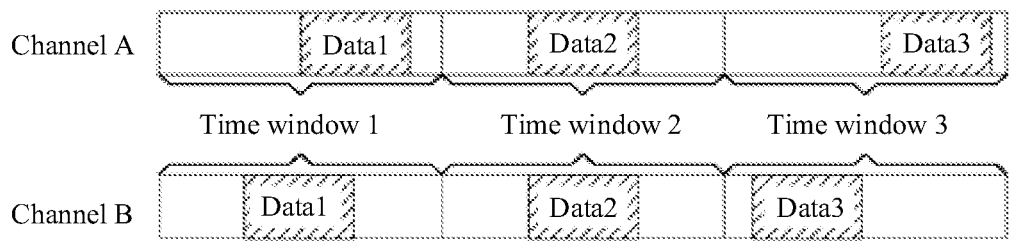
FIG. 3 is a schematic diagram of a time window provided by an example of the disclosure.

FIG. 3 is a schematic diagram of a time window provided by an example of the disclosure. Referring to FIG. 3, the channel A and the channel B are the same in the reference time of the first time window, and the reference time of the first time windows of the channel A and the channel B may be the standard time. For instance, as for the 100th minute defined by the system, the data of the first time window is ranked from the 100th minute defined by the system.

Figure 4:
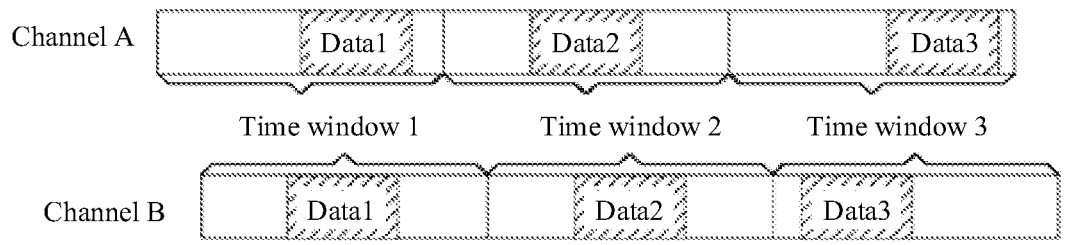
FIG. 4 is a schematic diagram of a time window provided by an example of the disclosure.

FIG. 4 is a schematic diagram of a time window provided by an example of the disclosure. Referring to FIG. 4, the channel A and the channel B are different in the reference time of the first time window, and the reference time of the first time windows of the channel A and the channel B may be the standard time.

Figure 5:
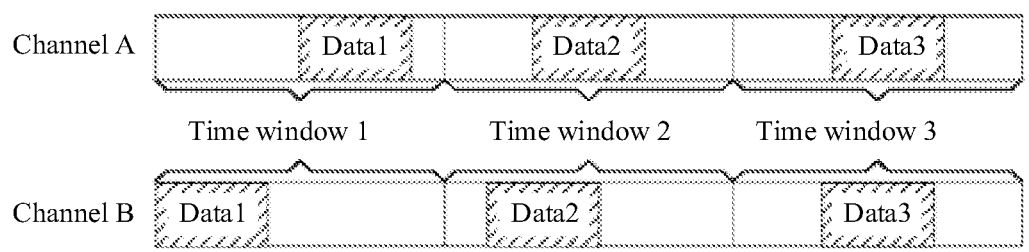
FIG. 5 is a schematic diagram of a time window provided by an example of the disclosure.

FIG. 5 is a schematic diagram of a time window provided by an example of the disclosure. Referring to FIG. 5, the channel A and the channel B are the same in the reference time of the first time window, and the reference time of the first time windows of the channel A and the channel B may be the time when the channel B receives data 1.

Figure 6:
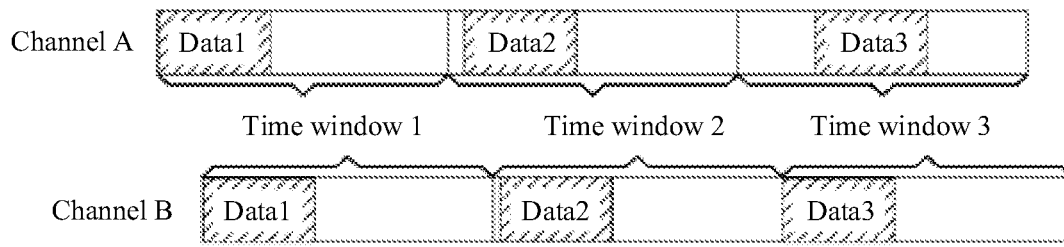
FIG. 6 is a schematic diagram of a time window provided by an example of the disclosure.

FIG. 6 is a schematic diagram of a time window provided by an example of the disclosure. Referring to FIG. 6, the channel A and the channel B are different in the reference time of the first time window; and the reference time of the first time window of the channel A may be the time when the channel A receives the data 1, and the reference time of the first time window of the channel B may be the time when the channel B receives the data 1.

In some examples, ranking the transmissions through the at least two channels in a set of time windows according to a transmission sequence through the at least two channels includes ranking a transmission through a channel with a high priority received in the set of time windows being transmitted earlier than a transmission through a channel with a low priority received in the set of time windows.

In some examples, ranking the received transmissions according to the sequence through the at least two channels includes ranking transmissions through two channels with the same priority received in the set of time windows in the same place.

In response to determining that there are a plurality of channels, there may be channels with different priorities and there may be channels with the same priority among these channels.

Taking FIG. 3 as an example, if the priority of the channel A is higher than that of the channel B, a data sequence of the two channels may be the data 1 of the channel A, the data 1 of the channel B, the data 2 of the channel A, the data 2 of the channel B, the data 3 of the channel A, and the data 3 of the channel B. In response to determining that the priority of the channel A is equal to that of the channel B, the data 1 of the channel A and the data 1 of the channel B are in the same place, the data 2 of the channel A and the data 2 of the channel B are in the same place, and the data 3 of the channel A and the data 3 of the channel B are in the same place. A data sequence in the channel A is the data 1, the data 2, and the data 3.

The aforesaid priorities of the channels are based on a situation that the two channels have the same priority relations of the time windows. For instance, the priority of the channel A is higher than that of the channel B, and in each time window, the priority of the channel A is higher than that of the channel B.

In other examples, the priorities of the two channels may also be set based on different time windows. For instance, the priority of the channel A is higher than that of the channel B in time windows 1 and 2, and the priority of the channel B is higher than that of the channel A in a time window 3. In this case, the data sequence of the two channels is the data 1 of the channel A, the data 1 of the channel B, the data 2 of the channel A, the data 2 of the channel B, the data 3 of the channel B, and the data 3 of the channel A.

It should be noted that, each time window in FIG. 3 to FIG. 6 corresponds to 1 piece of data, and when processing and transmitting speeds of the terminal are in relatively large fluctuation, there may be a situation of 2 pieces of data in one time window and no data in another time window. In this case, the first piece of data in one time window is still ranked according to the priorities of the channels, and data from the second piece is all ranked ahead of the data of the next time window in a time sequence.

Figure 7:
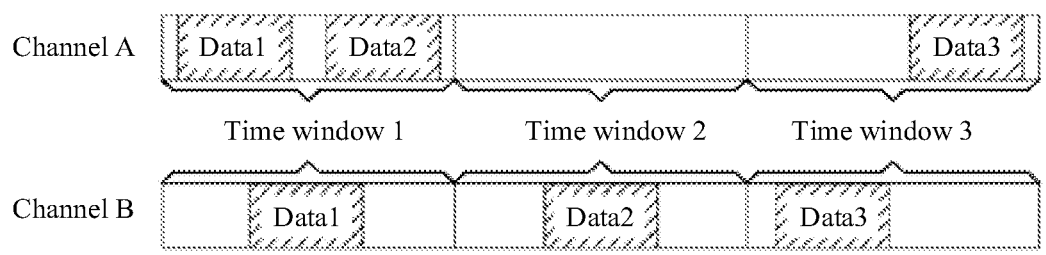
FIG. 7 is a schematic diagram of a time window provided by an example of the disclosure.

As shown in FIG. 7, assuming that the priority of the channel B is higher than that of the channel A, the data sequence at the moment is the data 1 of the channel B, the data 1 of the channel A, the data 2 of the channel A, the data 2 of the channel B, the data 3 of the channel B, and the data 3 of the channel A.

In some examples, the method further includes obtaining configuration information. The configuration information includes at least one of the following parameters: reference time of a time window; a time window length; and a channel priority.

The configuration information may be configured locally in the access network device, for instance, be configured through an interface or be configured in a protocol of the access network device. The configuration information may also be sent to the access network device through an entity of a core network, for instance, be transmitted to the access network device through a physical layer signaling, an upper layer signaling (media access control (MAC) signaling), a radio resource control (RRC) signaling or a broadcasting signaling.

The network element of the core network may be a mobility management entity function (MME).

In some examples, the time window length is positively correlated to a maximum sending duration. The maximum sending duration is a maximum duration needed for each channel to send data. For example, the at least two channels correspond to at least two devices, and the maximum sending duration is a maximum duration needed for the at least two channels to send one piece of data.

Sensors have different transmission capacities. For instance, a sensor u is higher in a transmission capability, larger in bandwidth, and higher in a multiple in multiple out (MIMO) capability compared to a sensor v. Under a circumstance that the sensors send data to the access network device simultaneously, the sensor u completes the transmission 0.1 ms ahead of the sensor v in average. At the moment, the time window may be set based on a sending duration used by the sensor v to transmit the data once. For instance, the sending duration used by the sensor v to transmit the data once is adopted.

In some examples, the time window length is positively correlated to a service cycle length, and the service cycle length is a cycle time length of a service corresponding to the data.

For instance, services vary in service cycle lengths of data processing. That is, the services have different requirements for granularity of time sequence. For instance, an ordinary medical sensor requires to identify a logic time sequence of 10 ms, so 10 ms may be used as the time window length. Further, the Internet of Vehicles requires to identify a logic time sequence of 1 ms, so 1 ms may be used as the time window length. Even further, industrial control and operations require to identify a logic time sequence of 0.1 ms, so 0.1 ms may be used as the time window length. When the time window length is set, it is not necessarily completely equal to the service cycle length, provided that a positive correlation relationship exists between the time window length and the service cycle length.

In some examples, the channel priority is negatively correlated to a device capability, the at least two channels correspond to at least two devices, and the device capability is a capability parameter of a device using each channel to send data.

A higher device capability corresponds to a high transmission speed. In response to that data transmitted by two devices is received in the same set of time windows, normally, the data of the device lower in transmission speed is acquired first, that is, acquisition time of the data of the device lower in transmission speed is ahead of that of the other device. In this way, the channel priority corresponding to the device lower in transmission speed is set to be high, so that in a ranking process, the data of the device lower in transmission speed is ranked ahead, which accords with a sequence of data acquisition.

In some examples, the method further includes receiving a configuration signaling sent by an entity of a core network. The configuration signaling is configured to indicate enabling or disabling of the time window.

According to the method for data transmission provided by the example of the disclosure, the access network device may be switched on/off through the configuration signaling issued by the network element of the core network, and in this way, the access network device is controlled whether to receive and process the data by using the time window.

For example, the configuration signaling may determine enabling or disabling of the time window through one bit. For instance, a bit 0 represents enabling, and a bit 1 represents disabling.

Further, in response to determining that the configuration signaling indicates enabling of the time window, the configuration signaling may also carry the aforesaid configuration information simultaneously.

In some examples, receiving the configuration signaling sent by the network element of the core network includes a physical layer signaling, a MAC signaling, a RRC signaling or a broadcasting signaling carrying the configuration signaling is received.

It should be noted that, the aforesaid steps 101-103 of FIG. 2 may be arbitrarily combined with the steps in the above examples.

Figure 8:
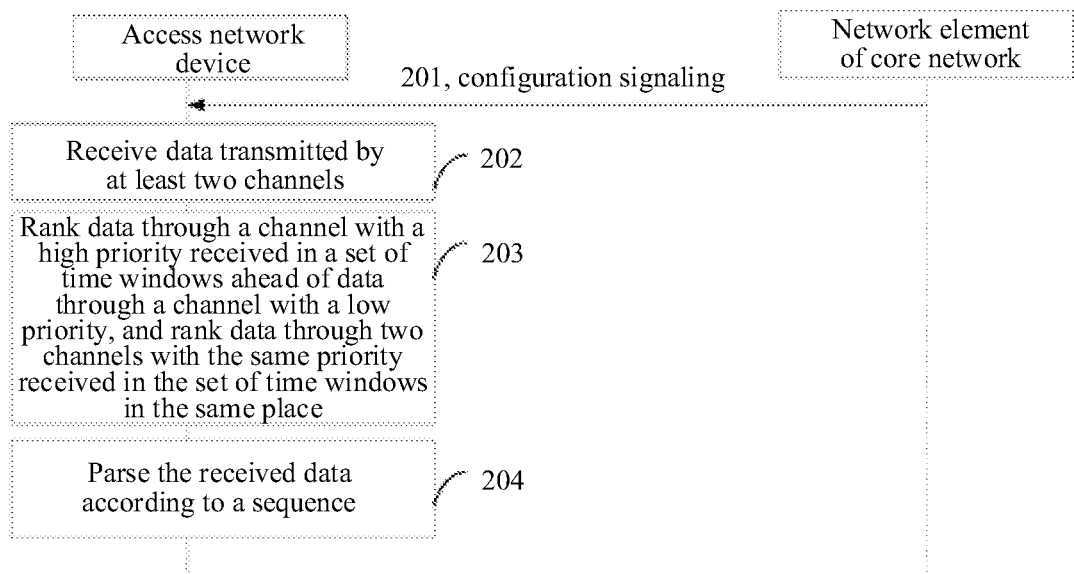
FIG. 8 is a flow chart of a method for data transmission illustrated according to an example.

FIG. 8 is a flow chart of a method for data transmission illustrated according to an example. Referring to FIG. 8, the method includes the following steps 201-204.

Step 201 includes the network element of the core network sends the configuration signaling to the access network device. The access network device receives the configuration signaling.

For example, the step 201 may include: the network element of the core network sends the physical layer signaling, the MAC signaling, the RRC signaling or the broadcasting signaling carrying the configuration signaling to the access network device; and the access network device receives the physical layer signaling, the MAC signaling, the RRC signaling or the broadcasting signaling carrying the configuration signaling.

The configuration signaling is configured to indicate enabling or disabling of the time window. For example, the configuration signaling may determine enabling or disabling of the time window through one bit. For instance, a bit 0 represents enabling, and a bit 1 represents disabling.

Further, in response to determining that the configuration signaling indicates enabling of the time window, the configuration signaling may also carry the aforesaid configuration information simultaneously. The configuration information includes at least one of reference time of a time window; a time window length; and a channel priority.

In some examples, the time window length is positively correlated to a maximum sending duration. The maximum sending duration is a maximum duration needed for each channel to send data.

Sensors have different transmission capacities. For instance, a sensor u is higher in a transmission capability, larger in bandwidth, and higher in a multiple in multiple out (MIMO) capability compared to a sensor v. Under a circumstance that the sensors send data to the access network device simultaneously, the sensor u completes the transmission 0.1 ms ahead of the sensor v in average. At the moment, the time window may be set based on a sending duration used by the sensor v to transmit data once. For instance, the sending duration used by the sensor v to transmit the data once is adopted.

In some examples, the time window length is positively correlated to a service cycle length, where the service cycle length is a cycle time length of a service corresponding to the data.

For instance, services vary in service cycle lengths of data processing. That is, the services have different requirements for granularity of time sequence. For instance, an ordinary medical sensor requires to identify a logic time sequence of 10 ms, so 10 ms may be used as the time window length. Further, the Internet of Vehicles requires to identify a logic time sequence of 1 ms, so 1 ms may be used as the time window length. Even further, industrial control and operations require to identify a logic time sequence of 0.1 ms, so 0.1 ms may be used as the time window length. When the time window length is set, it is not necessarily completely equal to the service cycle length, provided that a positive correlation relationship exists between the time window length and the service cycle length.

In some examples, the channel priority is negatively correlated to a device capability. The device capability is a capability parameter of a device using each channel to send data.

A higher device capability corresponds to a high transmission speed. In response to that data transmitted by two devices is received in the same set of time windows, normally, the data of the device lower in transmission speed is acquired first, that is, acquisition time of the data of the device lower in transmission speed is ahead of that of the other device. In this way, the channel priority corresponding to the device lower in transmission speed is set to be high, so that in a ranking process, the data of the device lower in transmission speed is ranked ahead, which accords with a sequence of data acquisition.

Referring back to FIG. 8, in step 202, the access network device receives the data transmitted by the at least two channels.

Here, the at least two channels correspond to at least two devices. That is, the at least two devices transmit data to the access network device through the at least two channels. The device here refers to a terminal, such as a sensor.

Step 203: the access network device ranks the data of the channel with the high priority received in the set of time windows ahead of the data of the channel with the low priority, and ranks the data through two channels with the same priority received in the set of time windows in the same place.

Taking FIG. 3 as an example, in response to determining that the priority of the channel A is higher than that of the channel B, a data sequence of the two channels may be the data 1 of the channel A, the data 1 of the channel B, the data 2 of the channel A, the data 2 of the channel B, the data 3 of the channel A, and the data 3 of the channel B. In response to determining that the priority of the channel A is equal to that of the channel B, the data 1 of the channel A and the data 1 of the channel B are in the same place, the data 2 of the channel A and the data 2 of the channel B are in the same place, and the data 3 of the channel A and the data 3 of the channel B are in the same place. A data sequence in the channel A is the data 1, the data 2, and the data 3.

It should be noted that, each time window in FIG. 3 to FIG. 6 corresponds to 1 piece of data, and when processing and transmitting speeds of the terminal are in relatively large fluctuation, there may be a situation of 2 pieces of data in one time window and no data in another time window. In this case, the first piece of data in one time window is still ranked according to the priorities of the channels, and data from the second piece is all ranked ahead of the data of the next time window in a time sequence.

As shown in FIG. 7, assuming that the priority of the channel B is higher than that of the channel A, the data sequence at the moment is the data 1 of the channel B, the data 1 of the channel A, the data 2 of the channel A, the data 2 of the channel B, the data 3 of the channel B, and the data 3 of the channel A.

Finally, in step 204, the access network device processes the received data according to the sequence.

For instance, a sequence of the data A is ahead of that of the data B, and the data A is parsed before the data B is parsed. Parsing here includes but is not limited to data decoding and data output. For instance, data of a medical sensor is decoded first, data that may be processed by a back-end processing device is obtained, then the decoded data is transmitted to the back-end processing device, and the back-end processing device performs diagnosis using the decoded data.

Figure 9:
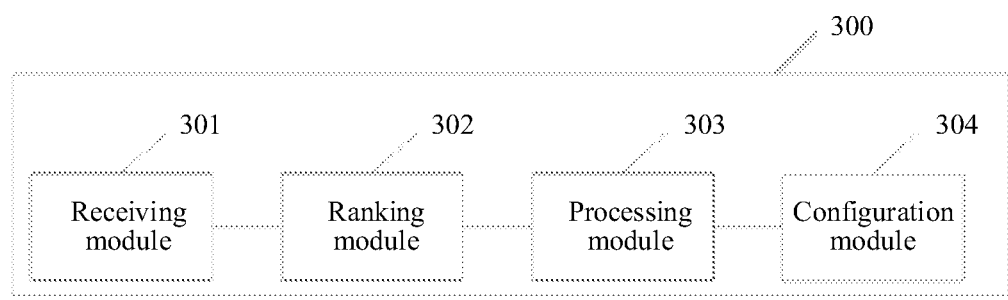
FIG. 9 is a schematic structural diagram of a communication apparatus illustrated according to an example.

FIG. 9 is a schematic structural diagram of a communication apparatus 300 illustrated according to an example. The apparatus 300 may realize a function of the access network device in the above method example. The function may be realized through hardware, or may be realized by hardware executing corresponding software. As shown in FIG. 9, the apparatus 300 includes: a receiving module 301, a ranking module 302 and a processing module 303.

The receiving module 301 is configured to receive transmissions of at least two channels.

The ranking module 302 is configured to determine a sequence of the transmissions through the at least two channels.

The processing module 303 is configured to process the received transmissions through the at least two channels according to the sequence of the transmissions through the at least two channels.

In some examples, the at least two channels are vortex wave channels with the same frequency and with different phase shifts or, the at least two channels are channels with different frequencies.

In some examples, the ranking module 302 is configured to rank the transmissions received from the at least two channels in a set of time windows according to a sequence through the at least two channels. The set of time windows is at least two time windows in one-to-one correspondence to the at least two channels.

In some examples, each channel corresponds to a plurality of continuous cyclic time windows.

In some examples, the first time window of each channel is a standard time window using standard time as reference time; or the first time window of each channel is a relative time window using the time of receiving the first piece of data from the channel as the reference time.

In some examples, the first time windows of any two channels correspond to the same or different in reference time.

In some examples, the ranking module 302 is configured to rank data through a channel with a high priority received in the set of time windows ahead of data through a channel with a low priority, and rank data through two channels with the same priority received in the set of time windows in the same place.

In some examples, the apparatus 300 further includes a configuration module 304, configured to obtain configuration information. The configuration information includes at least one of the following parameters: reference time of a time window; a time window length; and a channel priority.

In some examples, the time window length is positively correlated to a maximum sending duration. The maximum sending duration is a maximum duration needed for each channel to send data.

In some examples, the time window length is positively correlated to a service cycle length, and the service cycle length is a cycle time length of a service corresponding to the data.

In some examples, the channel priority is negatively correlated to a device capability. The device capability is a capability parameter of a device using each channel to send data.

In some examples, the receiving module 301 is further configured to receive a configuration signaling sent by an entity of a core network, where the configuration signaling is configured to indicate enabling or disabling of the time window.

In some examples, the receiving module 301 is configured to receive a physical layer signaling, a MAC signaling, a RRC signaling or a broadcasting signaling carrying the configuration signaling.

Figure 10:
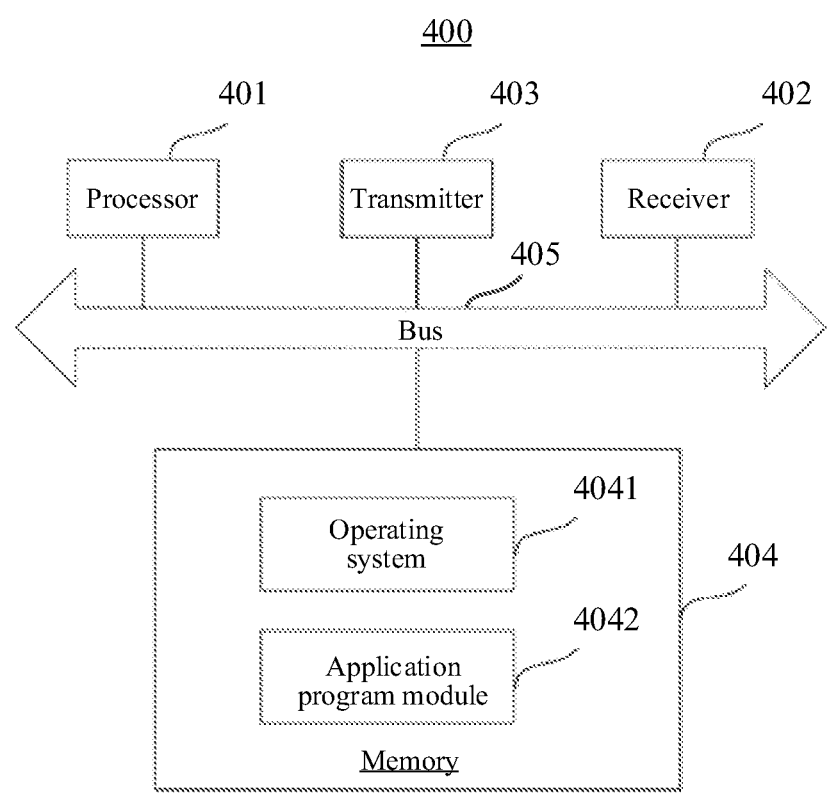
FIG. 10 is a block diagram of an access network device illustrated according to an example.

FIG. 10 is a block diagram of an access network device 400 illustrated according to an example. The access network device 400 may include: a processor 401, a receiver 402, a transmitter 403 and a memory 404. The receiver 402, the transmitter 403 and the memory 404 are respectively connected to the processor 401 via a bus 405.

The processor 401 includes one or more processing cores. The processor 401 executes a method executed by the access network device in the method for data transmission provided by the example of the disclosure by running software programs and modules. The memory 404 may be configured to store the software programs and modules. Specifically, the memory 404 may store an operating system 4041, and at least one functionally necessary application program module 4042. The receiver 402 is configured to receive communication data sent by other devices, and the transmitter 403 is configured to send communication data to other devices.

In an example, a computer readable storage medium is further provided. The computer readable storage medium stores at least one instruction, at least one program, a code set or an instruction set. The at least one instruction, the at least one program, the code set or the instruction set is loaded by the processor to execute the method for data transmission provided by the above method examples.

An example of the disclosure further provides a communication system. The communication system includes a terminal and an access network device. The access network device is the access network device provided by the example shown in FIG. 10.

Additional non-limiting embodiments of the disclosure include the following.

According to one aspect of an example of the disclosure, a method for data transmission is provided and includes:
receiving transmissions through at least two channels;
determining a sequence of the transmissions through the at least two channels; and
processing the received transmissions through the at least two channels according to the sequence of the transmissions through the at least two channels.

In some examples, the at least two channels are vortex wave channels with a same frequency and with different phase shifts; or, the at least two channels are channels with different frequencies.

In some examples, determining the sequence of the transmissions through the at least two channels includes: ranking the transmissions received from the at least two channels in a set of time windows according to a transmission sequence through the at least two channels, and the set of time windows is at least two time windows in one-to-one correspondence to the at least two channels.

In some examples, each channel corresponds to a plurality of continuous cyclic time windows.

In some examples, the first time window of each channel is a standard time window using standard time as reference time; or the first time window of each channel is a relative time window using the time of receiving the first transmission through the channel as the reference time.

In some examples, the first time windows of any two channels correspond to the same or different in reference time.

In some examples, ranking the transmissions through the at least two channels in a set of time windows according to a transmission sequence through the at least two channels includes: ranking a transmission through a channel with a high priority received in the set of time windows being transmitted earlier than a transmission through a channel with a low priority received in the set of time windows.

In some examples, ranking the received transmissions according to the sequence through the at least two channels includes: ranking transmissions through two channels with the same priority received in the set of time windows in the same place.

In some examples, the method further includes: obtaining configuration information, where the configuration information includes at least one of the following parameters: reference time of a time window; a time window length; or a channel priority.

In some examples, the time window length is positively correlated to a maximum sending duration, where the maximum sending duration is a maximum duration needed for each transmission sending through a channel.

In some examples, the time window length is positively correlated to a service cycle length, where the service cycle length is a cycle time length of a service corresponding to a transmission.

In some examples, the channel priority is negatively correlated to a device capability, where the device capability is a capability parameter of a device using each channel to send a channel transmission.

In some examples, the method further includes: receiving a configuration signaling sent by an entity of a core network, where the configuration signaling is configured to indicate enabling or disabling of the time window.

In some examples, receiving a configuration signaling sent by an entity of a core network includes: receiving the configuration signaling being carried by a physical layer signaling, a MAC signaling, a RRC signaling or a broadcasting signaling.

According to another aspect of an example of the disclosure, a data transmission communication apparatus is provided and includes:
- a receiving module, configured to receive transmissions of at least two channels;
- a ranking module, configured to determine a sequence of the transmissions through the at least two channels; and
- a processing module, configured to process the received transmissions through the at least two channels according to the sequence of the transmissions through the at least two channels.

In some examples, the at least two channels are vortex wave channels with a same frequency and with different phase shifts, or the at least two channels are channels with different frequencies.

In some examples, the ranking module is configured to rank the transmissions received from the at least two channels in a set of time windows according to a transmission sequence through the at least two channels. The set of time windows is at least two time windows in one-to-one correspondence to the at least two channels.

In some examples, each channel corresponds to a plurality of continuous cyclic time windows.

In some examples, the first time window of each channel is a standard time window using standard time as reference time, or the first time window of each channel is a relative time window using the time of receiving the first transmission through the channel as the reference time.

In some examples, the first time windows of any two channels correspond to the same or different in reference time.

In some examples, the ranking module is configured to rank a transmission through a channel with a high priority received in the set of time windows being transmitted earlier than a transmission through a channel with a low priority received in the set of time windows.

In some examples, the ranking module is configured to rank transmissions through two channels with the same priority received in the set of time windows in the same place.

In some examples, the apparatus further includes: a configuration module, configured to obtain configuration information, where the configuration information includes at least one of the following parameters: reference time of a time window; a time window length; or a channel priority.

In some examples, the time window length is positively correlated to a maximum sending duration, where the maximum sending duration is a maximum duration needed for each transmission sending through a channel.

In some examples, the time window length is positively correlated to a service cycle length, where the service cycle length is a cycle time length of a service corresponding to a transmission.

In some examples, the channel priority is negatively correlated to a device capability, where the device capability is a capability parameter of a device using each channel to send a channel transmission.

In some examples, the receiving module is further configured to receive a configuration signaling sent by an entity of a core network, where the configuration signaling is configured to indicate enabling or disabling of the time window.

In some examples, the receiving module is configured to receive the configuration signaling being carried by a physical layer signaling, a MAC signaling, a RRC signaling or a broadcasting signaling.

According to another aspect of an example of the disclosure, an access network device, is provided and includes: a processor; and a memory configured to store an instruction executable by the processor. The processor is configured to load and execute the executable instruction to implement the aforesaid method for data transmission.

According to another aspect of an example of the disclosure, a computer readable storage medium is provided. The computer readable storage medium, when an instruction stored is executed by a processor, is able to execute the aforesaid method for data transmission.

After considering the specification and practicing the disclosure disclosed here, those of skill in the art will easily think of other examples of the disclosure. The disclosure is intended to cover any variations, uses, or adaptive changes of the disclosure. These variations, uses, or adaptive changes follow the general principles of the disclosure and include common knowledge or conventional technical means in the technical field that are not disclosed in the disclosure. The specification and the examples are to be regarded as illustrative only, and the true scope and spirit of the disclosure are pointed out by the appended claims.

It should be understood that the disclosure is not limited to a precise structure that has been described above and shown in the drawings, and various modifications and changes can be made without departing from its scope. The scope of the disclosure is only limited by the appended claims.

What is claimed is:

1. A method for data transmission, the method comprising:
   receiving transmissions through at least two channels;
   determining a sequence of the transmissions through the at least two channels; and
   processing the received transmissions through the at least two channels according to the sequence of the transmissions through the at least two channels;
   wherein time corresponding to each channel is divided into a plurality of continuous time window, and determining the sequence of the transmissions through the at least two channels comprises:
   ranking the transmissions through the at least two channels in a set of time windows according to a transmission sequence through the at least two channels; wherein
   the set of time windows is at least two time windows in one-to-one correspondence to the at least two channels, and the transmission sequence through the at least two channels is set according to different time windows.

2. The method according to claim 1, wherein the at least two channels are vortex wave channels with a same frequency and different phase shifts; or,
   the at least two channels are channels with different frequencies.

3. The method according to claim 1, wherein a first time window of each channel is a standard time window using standard time as reference time;
   or,
   the first time window of each channel is a relative time window using the time of receiving a first transmission through the channel as the reference time.

4. The method according to claim 3, wherein the first time windows of any two channels correspond to the same or different reference time.

5. The method according to claim 1, wherein the ranking the transmissions through the at least two channels in a set of time windows according to a transmission sequence through the at least two channels comprises:
ranking a transmission through a channel with a high priority received in the set of time windows being transmitted earlier than a transmission through a channel with a low priority received in the set of time windows;
or
ranking transmissions through two channels with a same priority received in the set of time windows in a same place.

6. The method according to claim 1, further comprising:
obtaining configuration information, wherein the configuration information comprises at least one of:
reference time of a time window;
a time window length; or
a channel priority.

7. The method according to claim 6, wherein
the time window length is positively correlated to a maximum sending duration, wherein the maximum sending duration is a maximum duration needed for each transmission sending through a channel;
or
the time window length is positively correlated to a service cycle length, and the service cycle length is a cycle time length of a service corresponding to a transmission;
or
the channel priority is negatively correlated to a device capability, and the device capability is a capability parameter of a device using to send a channel transmission.

8. The method according claim 1, further comprising:
receiving a configuration signaling sent by an entity of a core network, wherein the configuration signaling is configured to indicate enabling or disabling of the time window.

9. The method according to claim 8, wherein receiving a configuration signaling sent by an entity of the core network comprises:
receiving the configuration signaling being carried by a physical layer signaling, a MAC signaling, a RRC signaling or a broadcasting signaling.

10. The method according to claim 1, wherein the transmission sequence through the at least two channels is different in a case where the set of time windows is different.

11. The method according to claim 1, wherein each channel corresponds to a plurality of continuous cyclic time windows, and the set of time windows correspond to a same number of cycles;
wherein determining the sequence of the transmissions through the at least two channels further comprises:
ranking data received in a former cycle ahead of data received in a latter cycle in a case where data in different cycles is received.

12. An access network device, comprising:
a processor; and
a memory configured to:
receive transmissions through at least two channels;
determine a sequence of the transmissions through the at least two channels; and
process the received transmissions through the at least two channels according to the sequence of the transmissions through the at least two channels;
wherein time corresponding to each channel is divided into a plurality of continuous time window, and determining the sequence of the transmissions through the at least two channels comprises:
ranking the transmissions through the at least two channels in a set of time windows according to a transmission sequence through the at least two channels;
wherein
the set of time windows is at least two time windows in one-to-one correspondence to the at least two channels, and the transmission sequence through the at least two channels is set according to different time windows.

13. The access network device according to claim 12, wherein the at least two channels are vortex wave channels with a same frequency and different phase shifts; or,
the at least two channels are channels with different frequencies.

14. The access network device according to claim 12, wherein a first time window of each channel is a standard time window using standard time as reference time;
or,
the first time window of each channel is a relative time window using the time of receiving a first transmission through the channel as the reference time.

15. The access network device according to claim 14, wherein the first time windows of any two channels correspond to the same or different reference time.

16. The access network device according to claim 12, wherein the processor is configured to:
rank a transmission through a channel with a high priority received in the set of time windows being transmitted earlier than a transmission through a channel with a low priority received in the set of time windows;
or
rank transmissions through two channels with a same priority received in the set of time windows in a same place.

17. The access network device according to claim 12, wherein the processor is further configured to:
obtain configuration information, wherein the configuration information comprises at least one of:
reference time of a time window;
a time window length; or
a channel priority.

18. The access network device according to claim 12, wherein the transmission sequence through the at least two channels is different in a case where the set of time windows is different.

19. The access network device according to claim 12, wherein each channel corresponds to a plurality of continuous cyclic time windows, and the set of time windows correspond to a same number of cycles;
wherein the processor is further configured to:
ranking data received in a former cycle ahead of data received in a latter cycle in a case where data in different cycles is received.

20. A non-transitory computer readable storage medium storing computer executable instructions, the computer executable instructions when executed by a processor, cause the processor to execute a method comprising
receiving transmissions through at least two channels;
determining a sequence of the transmissions through the at least two channels; and processing the received transmissions through the at least two channels according to the sequence of the transmissions through the at least two channels;

wherein time corresponding to each channel is divided into a plurality of continuous time window, and determining the sequence of the transmissions through the at least two channels comprises:

ranking the transmissions through the at least two channels in a set of time windows according to a transmission sequence through the at least two channels; wherein the set of time windows is at least two time windows in one-to-one correspondence to the at least two channels, and the transmission sequence through the at least two channels is set according to different time windows.

* * * * *